(12) United States Patent
Armellin et al.

(10) Patent No.: US 7,838,805 B2
(45) Date of Patent: Nov. 23, 2010

(54) HEATING DEVICE FOR PLASTIC PREFORMS

(75) Inventors: Alberto Armellin, Vittorio Veneto (IT); Carlo Corocher, Conegliano (IT); Fabrizio Dughiero, Piove Di Sacco (IT); Michele Forzan, Padua (IT); Matteo Zoppas, Conegliano (IT)

(73) Assignee: S.I.P.A. Societa Industrializzazione Progettazione E Automazione S.p.A. (IT)

( * ) Notice: Subject to any disclaimer, the term of this patent is extended or adjusted under 35 U.S.C. 154(b) by 0 days.

(21) Appl. No.: 12/066,652

(22) PCT Filed: Sep. 12, 2006

(86) PCT No.: PCT/EP2006/066268
§ 371 (c)(1),
(2), (4) Date: Mar. 12, 2008

(87) PCT Pub. No.: WO2007/031509
PCT Pub. Date: Mar. 22, 2007

(65) Prior Publication Data
US 2008/0217326 A1  Sep. 11, 2008

(30) Foreign Application Priority Data
Sep. 13, 2005  (IT)  .................. RM2005A0466

(51) Int. Cl.
*H05B 6/14* (2006.01)
(52) U.S. Cl. ................ 219/635; 219/633; 219/659; 156/285

(58) Field of Classification Search ......... 219/633–635, 219/643, 647–652, 658, 659, 670, 672, 674, 219/676; 156/379.6, 380.2
See application file for complete search history.

(56) References Cited

U.S. PATENT DOCUMENTS

| | | | |
|---|---|---|---|
| 2,757,267 A * | 7/1956 | Brauer et al. ............... | 219/644 |
| 3,604,880 A * | 9/1971 | O'Neill ...................... | 219/633 |
| 4,315,725 A | 2/1982 | Yoshino et al. | |
| 4,560,430 A * | 12/1985 | Watanabe et al. ........... | 156/285 |
| 5,180,893 A | 1/1993 | Sugiyama et al. | |
| 6,844,533 B1 | 1/2005 | Chuang | |
| 2004/0164070 A1 | 8/2004 | Terano | |

FOREIGN PATENT DOCUMENTS

EP    0 849 067 A    6/1998

\* cited by examiner

*Primary Examiner*—Quang T Van
(74) *Attorney, Agent, or Firm*—Knobbe, Martens, Olson & Bear, LLP

(57) ABSTRACT

Preform heating device able to perform a precise and strongly localised heating of the preforms before the blow moulding phase of the plastic bottle or container production process. This device has an innovative construction configuration, thus allowing high efficiency thanks to the significant reduction in the energy required to reach the project temperatures in the heating element in a very rapid way. The inductor does not heat the preform directly, but takes to the temperature set, through the concentration of the magnetic flow, generated by the passage of current, a conductor material of a particular form that, by irradiation and convection, in turn heats the PET.

17 Claims, 5 Drawing Sheets

HEATING DEVICE FOR PLASTIC PREFORMS

CROSS REFERENCE TO RELATED APPLICATIONS

This application claims the benefit and priority to and is a U.S. National Phase of PCT International Application Number PCT/EP2006/066268, filed on Sep. 12, 2006. This application claims the benefit and priority to Italian Application No. RM2005A000466 filed on Sep. 13, 2005. The disclosures of the above-referenced applications are hereby expressly incorporated by reference in their entirety.

TECHNICAL FIELD

The present invention refers to a preform heating device, suited in particular for induction heating of preforms for the production of bottles and containers by means of blow moulding.

STATE OF THE ART

Different devices are known for heating preforms used in the production of hollow bodies in plastic material by means of the blow moulding technique.

One example of such devices is described in document WO92/15442. This device provides additional heat by irradiation and convection, by means of a dedicated heating element, to a transition region in the preform wall between portions of wall subject to different degrees of expansion during blowing, in particular between one region subject to little or even no expansion and another region in which expansion is far greater.

However, in the known devices, this heating element is in turn heated by direct conduction, thus causing overheating problems with significant temperatures reached by the components of the entire device; the presence of electric resistances entails wear thereof over time and, consequently, greater maintenance.

The thermal profile of the components, determined by the design of such devices also entails a high dissipation of power in order to allow the reaching of the project temperature in the element heating the preform. This also leads to a non-precise focalization of heat flow, due also to a structure difficult to customise, poor rapidity of preform heating due to a significant thermal inertia of the structure and at the maximum temperature limit that can be achieved with traditional resistances.

An innovative preform heating device is therefore required that makes it possible to overcome the above drawbacks.

SUMMARY OF THE INVENTION

One primary purpose of the present invention is that of making a preform heating device that allows a precise and strongly localised heating of the preforms before the blow moulding phase of the plastic bottle or container production process.

A further purpose is to provide a preform heating device that presents an innovative construction configuration, thus allowing better performance with respect to the solution with hot air conditioning systems, thanks to the reduction in the energy required to reach the project temperatures in the heating element.

Lastly, a further purpose is to provide an infra-red heating device with a simple and easily replaceable irradiating component.

The present invention therefore proposes to achieve the purposes described above by making a preform heating device for the production of plastic hollow bodies that, according to claim 1, comprises at least one induction means (2) suitable for inducing, when current passes therein, a magnetic flow on at least one heat transmission means (4), in order to transmit by irradiation a predefined quantity of heat to at least one preform (10) suitable for being inserted into said device.

Advantageously, this device is able to guarantee, within predetermined tolerances, a thermal profile assigned both along the thickness and in the direction of the length of the piece to heat, usually in PET. The inductor does not directly heat the piece, also because the preform is constituted by a non-conductive material but, by means of a magnetic flow, it takes to temperature a ring of conductor material with an opportune section that, by irradiation, in turn heats the PET preform area.

Advantageously, a flow concentrator may be provided suited to better concentrating the useful magnetic flow to the heating element. This further improves the thermal profile of the invention device components, in order to avoid overheating drawbacks and to considerably improve the performance and efficiency of the entire system.

In certain applications it is in any case possible to avoid the use of the flow concentrator, thus simplifying the structure of the device.

The dependent claims describe preferred embodiments of the invention.

BRIEF DESCRIPTION OF THE FIGURES

Further characteristics and advantages of the invention will be further evident in view of the detailed description of a preferred, though not exclusive, embodiment of an illustrated preform heating device, such as illustrated by way of non limiting example with the aid of the appended drawings wherein.

DETAILED DESCRIPTION OF A PREFERRED EMBODIMENTS

Figure 1:
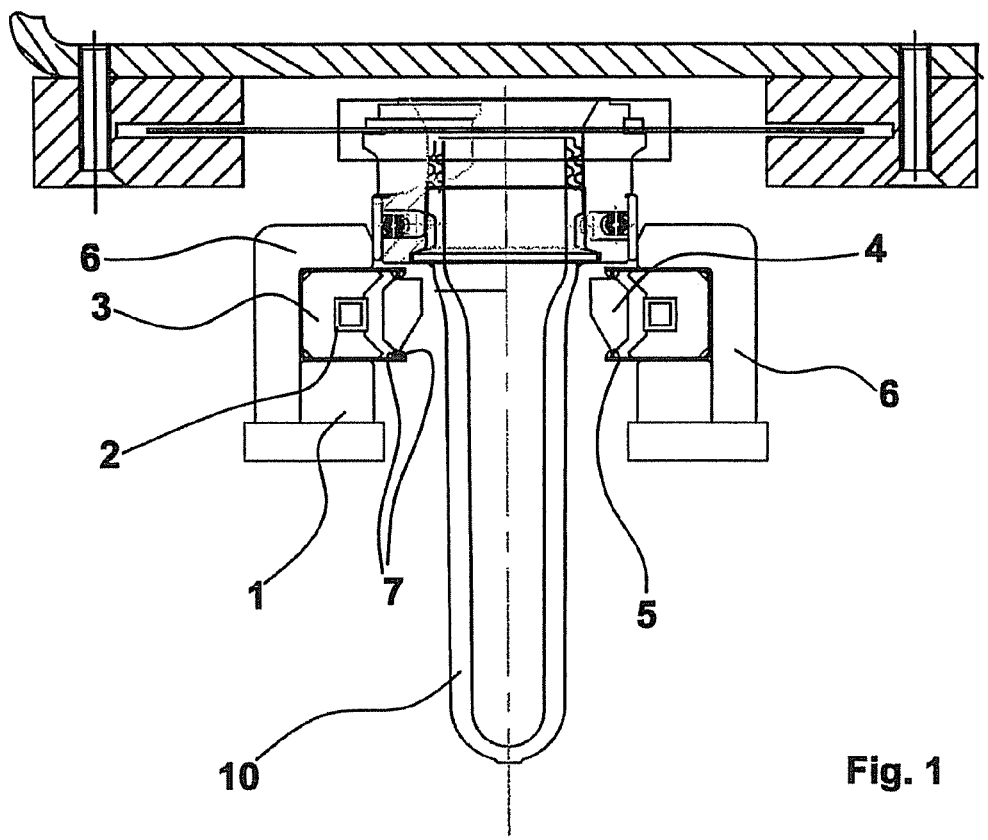
FIG. 1 shows a section of a first embodiment of the heating device according to the present invention.

With reference to Figures from 1 to 4, different embodiments of a preform heating device are illustrated, comprising:
an inductor 2,
an optional flow concentrator of magnetic dielectric material 3,
a heater ring 4,
at least 1 support 5 of said ring.

This device further comprises a support base 1, generally in steel, and at least one external centring support 6 of the device, preferably in aluminium. Said base 1 and said at least one centring support 6 are joined by means of clamping means 11, such as screws, bolts or other similar elements.

The inductor 2, preferably in copper, crosses the external centring support 6 and presents inside the device a configuration that is preferably, but not necessarily, circular. The passage of electric current in the inductor produces a magnetic field wherein the flow is advantageously conveyed, also by means of the flow concentrator 3, on the heater ring 4, for example in high electrical resistance alloys that are resistant to high temperatures, such as, for instance, Ni—Cr—Fe alloys, in such a way as to allow this ring to reach a predetermined temperature, preferably higher than 800° C. This temperature of the ring 4 is suitable for transmitting heat, by irradiation, to a preform 10, for a predefined time suitable for an appropriate preheating of the preforms used in the blow production of plastic bottles and containers. The cover of the device in fact has a hole of appropriate dimensions for introducing the preform 10 inside, in the area surrounded by the heater ring 4.

Advantageously, the inductor 2 can be cooled by means of flowing of water or another coolant fluid inside thereof.

In the embodiment in FIG. 1 the ring 4, with a polygonal section, is held in position by an anchorage system, simple from the constructive point of view, that firmly fixes together the flow concentrator 3 and the inductor 2 and has a support 5 of the ring provided with individually isolated metal tabs 7. This solution makes it possible to have good thermal insulation between the heater ring 4 and the remaining device components, especially if the phenomena of conduction and convection are considered.

Figure 2:
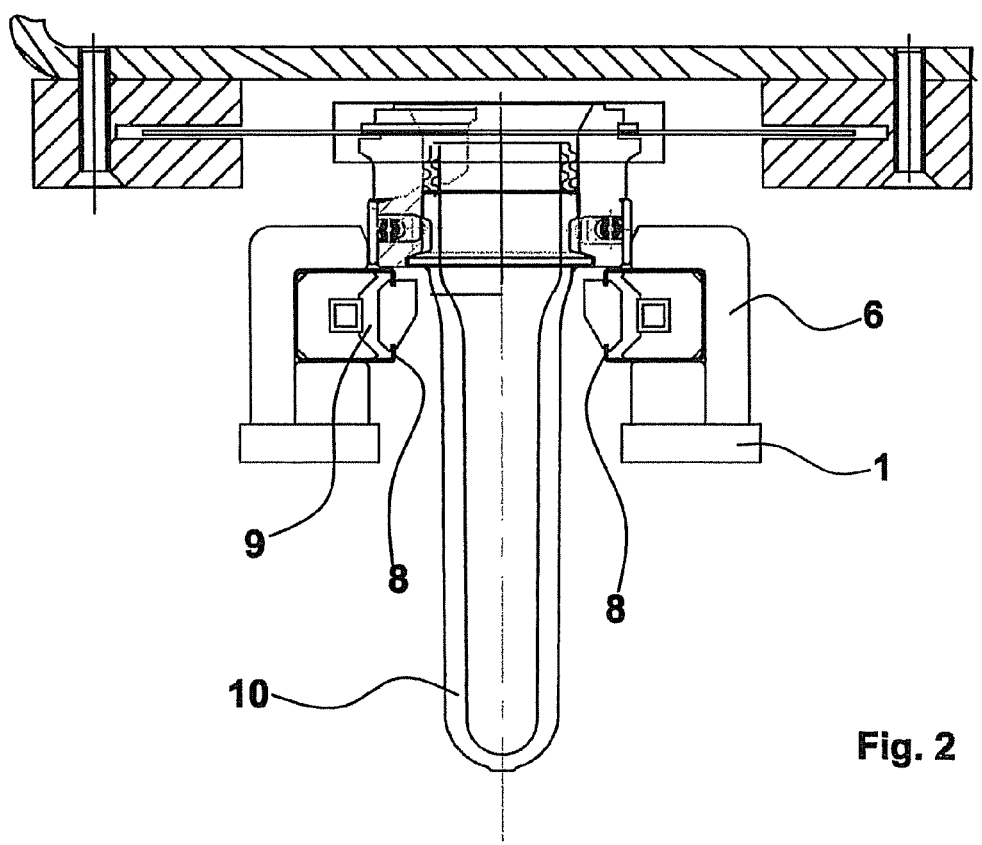
FIG. 2 shows a section of the heating device in FIG. 1 with a variant relating to a component.

In FIG. 2 an even simpler embodiment of the anchorage system has the extremities 8 of the support 5 trapped in housings provided in the ring 4. In the devices in FIGS. 1 and 2, the concentrator 3 has a form such as to house the inductor 2 inside the device. Between the inductor-concentrator block and the ring 4 there is a gap 9.

Figure 3:
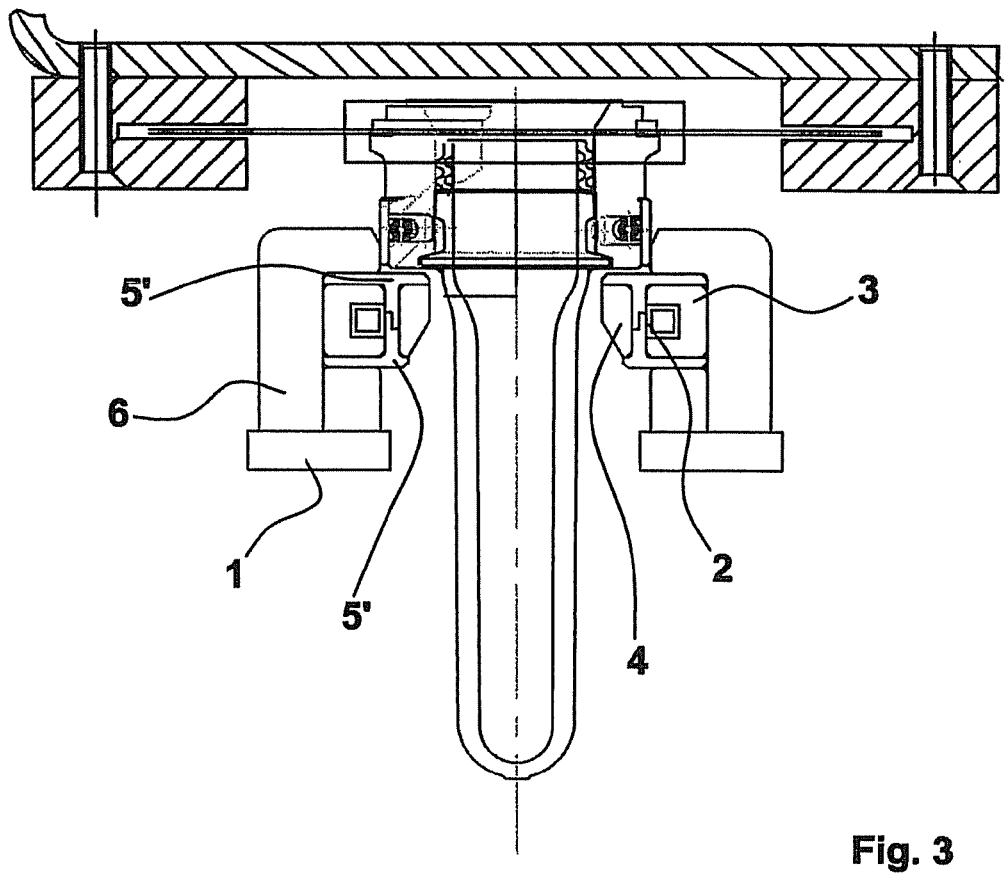
FIG. 3 shows a section of a second embodiment of the invention device.

One advantageous embodiment, illustrated in FIG. 3, determines a sturdier configuration of the invention device and a greater protection of the other irradiation components of the heater ring 4. The support 5 of the ring, in this embodiment, is in fact thicker and is constituted by one or more plates 5', with a complementary form, constituted by a refractory material, such as oxides, ceramic or fibre-reinforced refractory cement, able to resist at the operating temperature of the heating ring. The temperature of the ring is strongly influenced by its thermal conductibility, which is therefore preferably lower than 1 W/m K.

In this case, the inductor-concentrator block and the ring are joined to one another by said refractory plates that at the same time however prevent the direct contact thereof.

Figure 4:
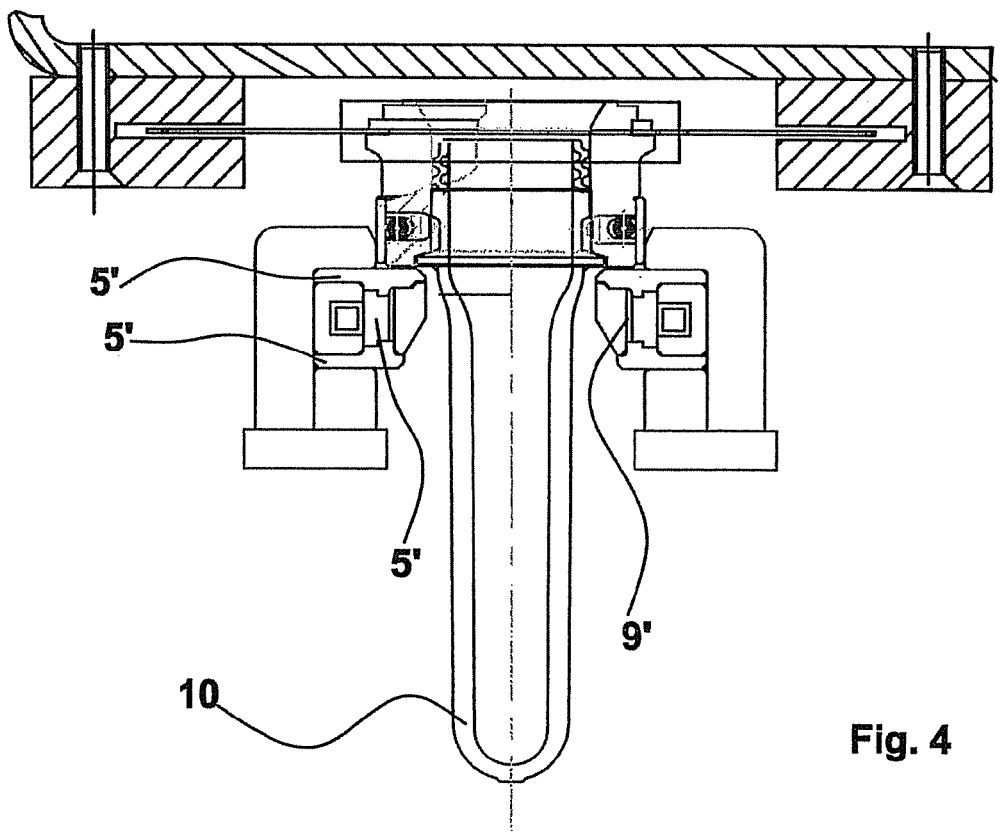
FIG. 4 shows a section of the device in FIG. 3 with a variant relating to a component.
Figure 5A:
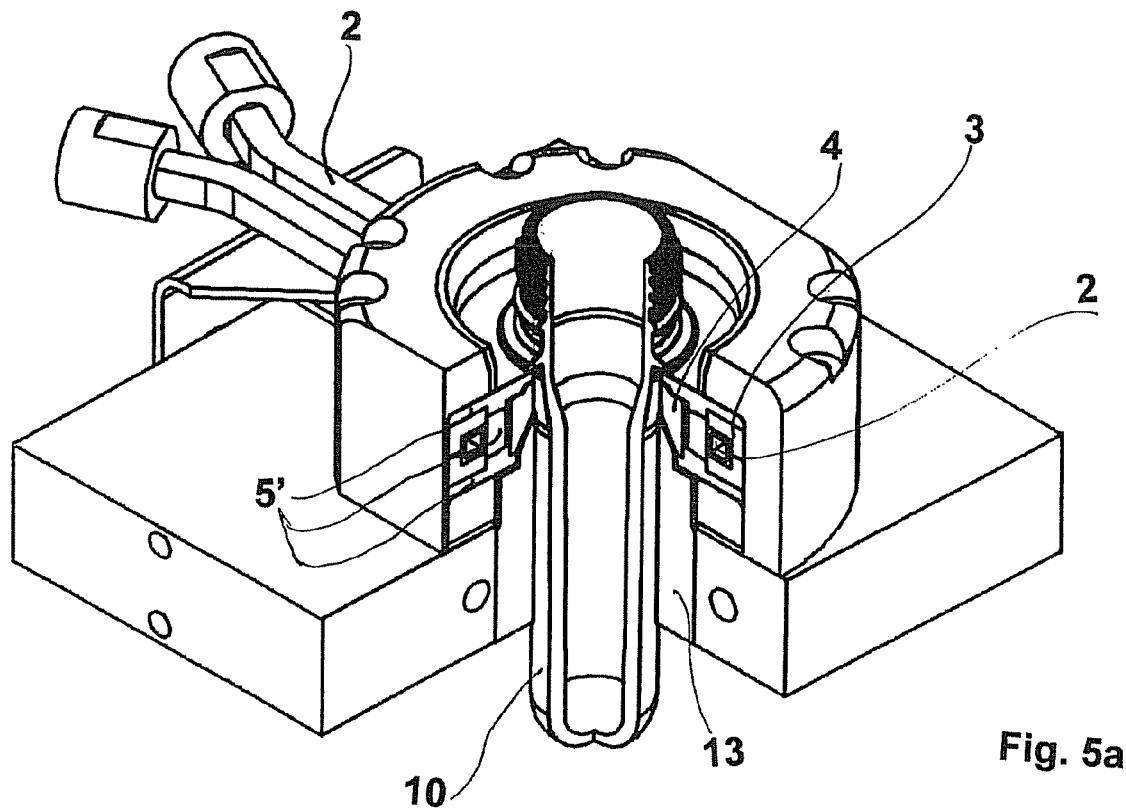
FIG. 5 shows an axonometric view of a section of the invention device.
Figure 5B:
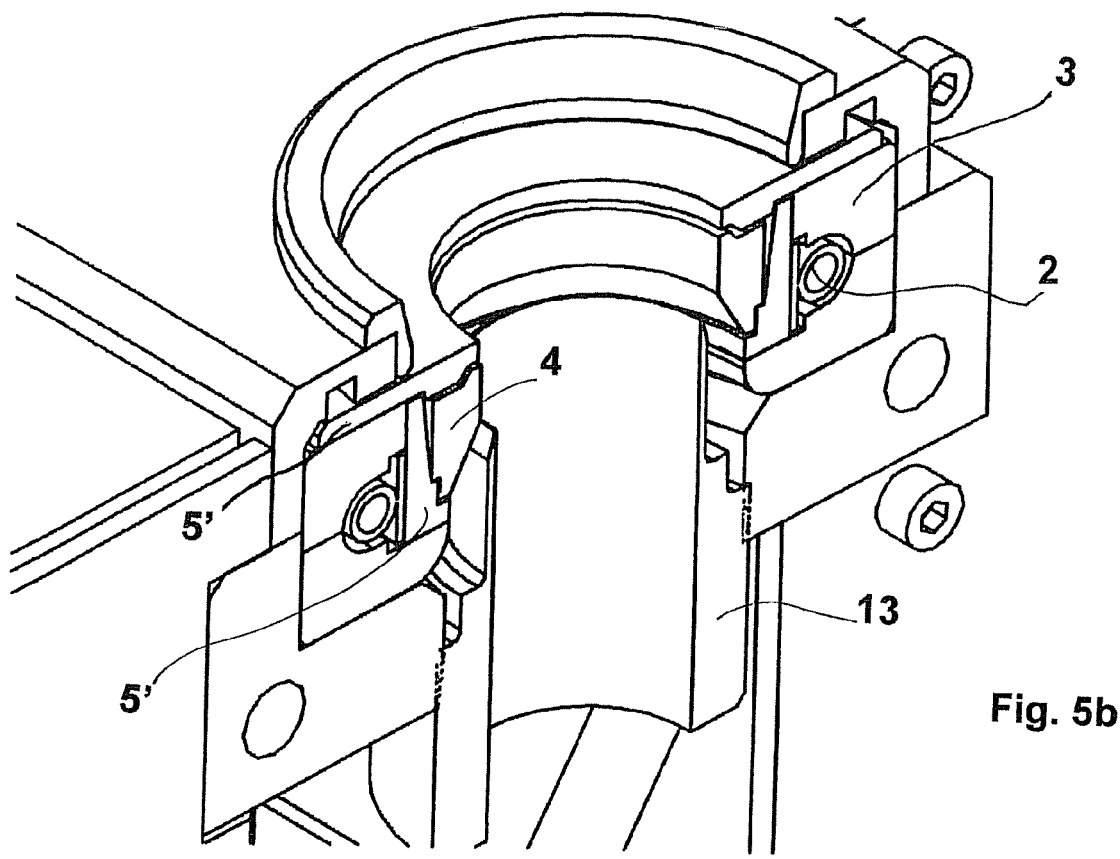

One advantageous variant, illustrated in FIG. 4, in the embodiment in FIG. 3 has a gap 9' between the ring 4 and refractory plates 5'. The presence of this gap 9' guarantees a further protection from overheating for device components and, therefore, a lower dissipation of energy.

In order to focus the irradiation, an adjustable screen 13 may advantageously be provided, arranged between the body of the preform 10, inserted into the device, and the internal components of the device itself in such a way as to further improve the focalization of the heating of a predetermined area of the preform, for example the neck.

In order to improve the performance of the heating device of the invention, certain embodiments were subject to tests, with components made of different material in each test.

As a result of these tests, a flow concentrator 3 made of magnetic dielectric material was chosen for the invention device.

In fact, such material makes it possible to obtain the temperature preset on the ring 4 using a feeder that provides a current less than 40% of that which it would were the concentrator 3 of another material, for example glass-bonded ferrite. Despite the fact that glass-bonded ferrite is a low cost material, the use thereof in this application would entail greater consumption and a higher cost of the same feeder.

The tests performed on two devices with concentrator 3 in magnetic dielectric and glass-bonded ferrite material respectively, with a frequency generator equal to 10 kHz, have made it possible to obtain the following results, which we report as an example, relating to the total active and dissipated power used, to efficiency and to the current dispensed in order to reach in the ring 4 a temperature of 900° C. in a stationery non-transient state:

|  | magnetic dielectric material | glass-bonded ferrite |
| --- | --- | --- |
| Current | 800 A | 1400 A |
| Active power ring | 346 W | 355 W |
| Power dissipated in the inductor | 437 W | 659 W |
| Power dissipated in the support base | 53 W | 130 W |
| Power dissipated into the supports 6 | 29 W | 148 W |
| Total dissipated power | 519 W | 937 W |
| Total power dispensed | 866 W | 1292 W |
| Efficiency | 40% | 27.5% |

It should be noted how the flow concentrator of magnetic dielectric material significantly improves the efficiency of the device, allows the use of a smaller dimension feeder and a less powerful cooling system as the total power dissipated is lower.

By analysing the value of the voltage at the ends of the feeder and the phasing between voltage and current and consequently the reactive powers in question, one sees that with the concentrator 3, or nucleus, made of magnetic dielectric material a far lower reactive power is absorbed than with the glass-bonded ferrite.

By means of in frequency analysis, is can also be observed that the concentrator 3 of magnetic dielectric material allows a higher efficiency even at varying frequency.

Thermographic analysis showed how the temperatures reached during non transient operation of the device of the different components are perfectly tolerable by the materials used.

Advantageously for the production of bottles and containers starting from preforms in a dedicated plant, the use of a plate or multi-cavity module is envisaged upstream from the blow moulding machine, able to house in a matricial configuration, or in a row, a series of heating devices according to the present invention, suited to housing the preforms to be heated.

Figure 6:
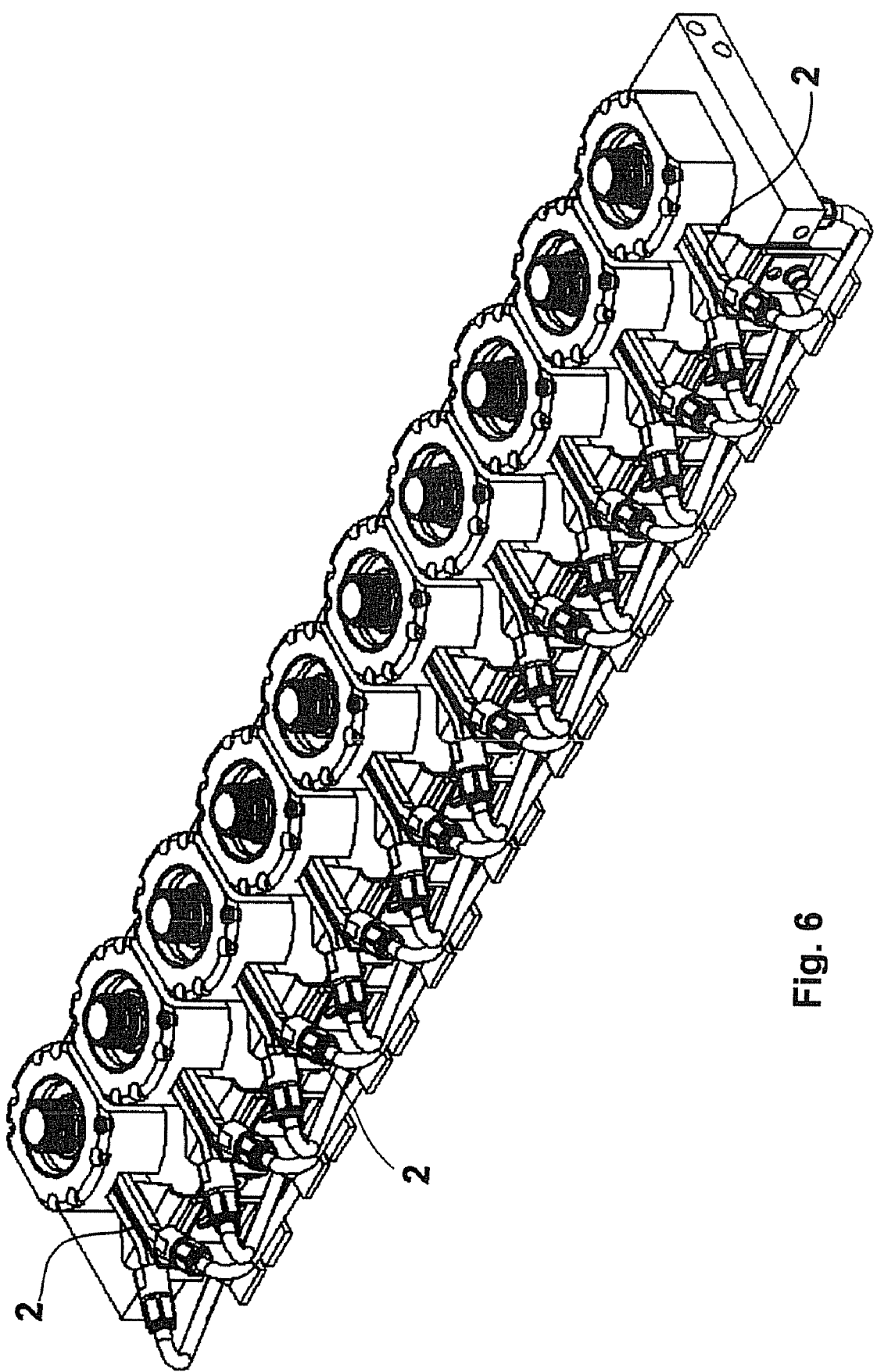
FIG. 6 shows an axonometric view of several devices, according to the device, arranged linearly.
Figure 7:
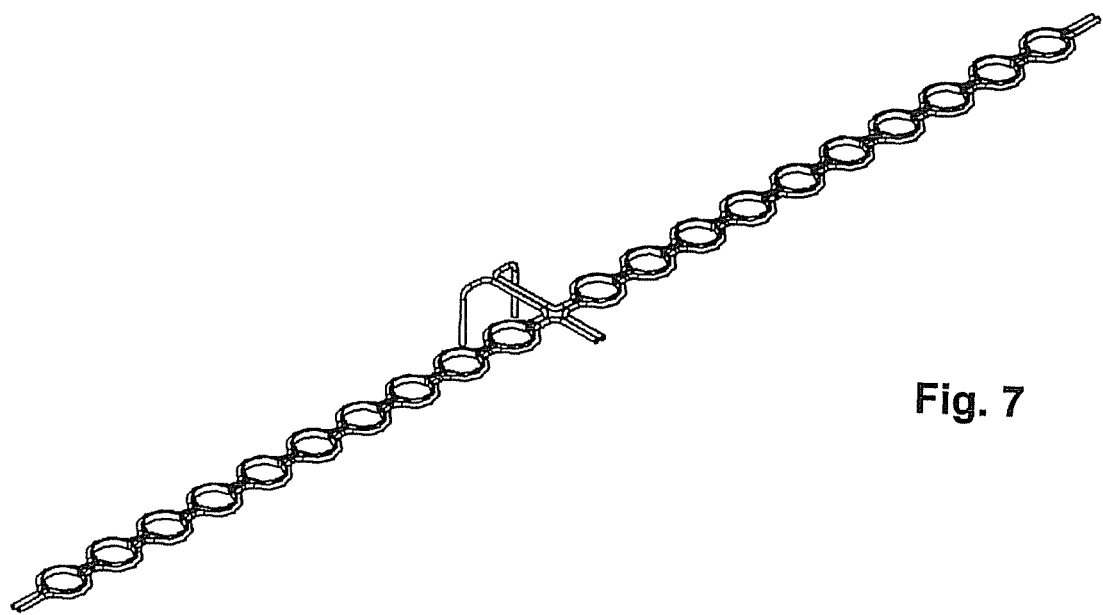
FIGS. 7 and 7a show a different embodiment of the inductors 2' with a different arrangement of the power connection to the inductors.
Figure 7A:
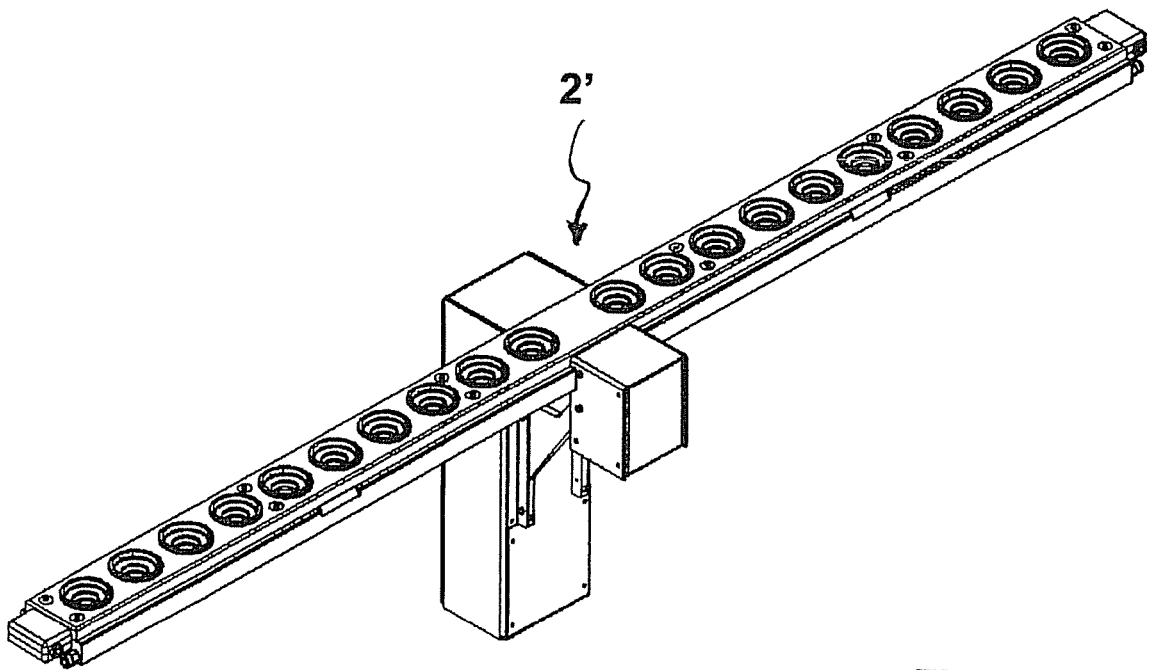

One example of multicavity module with linear arrangement of the devices according to the invention is illustrated in FIG. 6.

For the serial powering of twenty devices of the same type, for instance, it is possible to use a generator with a power of just 20 kW, therefore 1 kW of power input per cavity.

The device of the present invention, for heating the preforms used in the production of bottles for standard type beverages, has a consumption of approximately 0.8 kW/cavity with a saving of approximately 20% with respect to the consumption of known hot air jet heating devices. The specific heating power is even higher than that obtained with the known devices and reaches at least 15 W/cm².

Further advantages of the invention device with respect to the hot air jet devices are represented by:
- a greater heating precision in an area of the preform that depends only on the device geometry and not on the hot air flows, and therefore a greater heating process stability;
- a control of the process performed considering the temperature parameter alone;
- the presence of a perimeter heating source that makes unnecessary even a partial rotation of the preform.

From a mechanical point of view, the invention device presents high reliability due to the presence of a few mechanical components and also of high stability in that, with the configurations described in the various variants, no thermal expansion of the components is observed. The device is also less complex in that for correct heating absolutely no preform rotation is required. Furthermore, the absence of any electrical resistance significantly reduces the maintenance needed for a correct device functioning.

Lastly, with such device, it is possible to heat preforms of various shapes, such as ovals, with different thickness distributions and even at low axial stretch ratios, such as in the case of containers with long necks.

The particular embodiments described herein do not restrict the scope of this application, which covers all the invention variants defined in the claims.

The invention claimed is:

1. A heating device of plastic preforms for the production of plastic objects, comprising:
   at least one inductor, wherein the inductor is suitable for inducing, on the passage of current therein, a magnetic flow on at least one heat transmission component, in order to transmit by irradiation a predetermined quantity of heat to at least one predetermined portion of at least one preform when inserted in the heating device, wherein the predetermined portion is smaller than the entire preform;
   wherein the at least one heat transmission component comprises a ring of polygonal section arranged between the inductor and a space provided for the at least one predetermined portion of the preform to be inserted into the heating device; and
   at least one magnetic flow concentrator having a ring shape surrounding partly said at least one inductor and arranged around said at least one heat transmission component, wherein the ring is held in position by an anchorage system that firmly fixes together the magnetic flow concentrator and the inductor.

2. The device according to claim 1, wherein said anchorage system is provided with a support for supporting said ring.

3. The device according to claim 2, wherein said support comprises metal tabs.

4. The device according to claim 3, wherein a base and device centering supports are provided, reciprocally joined by a clamping device.

5. The device according to claim 4, wherein there is provided an adjustable screen arranged between the space provided for the preform to be inserted into the device and internal components of the device in such a way as to further improve the focalisation of the heating of the preform.

6. The device according to claim 2, wherein said support comprises extremities arranged in corresponding housings provided on the ring.

7. The device according to claim 6, wherein a base and device centering supports are provided, reciprocally joined by a clamping device.

8. The device according to claim 7, wherein there is provided an adjustable screen arranged between the space provided for the preform to be inserted into the device and internal components of the device in such a way as to further improve the focalisation of the heating of the preform.

9. The device according to claim 2, wherein said support comprises at least one plate of low thermal conductibility refractory material.

10. The device according to claim 9, wherein two or more plates are provided with a complementary shape between them.

11. The device according to claim 9, wherein a gap is provided between said at least one heat transmission component and said at least one plate.

12. The device according to claim 9, wherein a base and device centering supports are provided, reciprocally joined by a clamping device.

13. The device according to claim 12, wherein there is provided an adjustable screen arranged between the space provided for the preform to be inserted into the device and internal components of the device in such a way as to further improve the focalisation of the heating of the preform.

14. The device according to claim 1, wherein a gap is provided between said at least one heat transmission component and said concentrator.

15. The device according to claim 14, wherein a base and device centering supports are provided, reciprocally joined by a clamping device.

16. The device according to claim 15, wherein there is provided an adjustable screen arranged between the space provided for the preform to be inserted into the device and internal components of the device in such a way as to further improve the focalisation of the heating of the preform.

17. The device according to claim 14, wherein the ring is comprised of a polygonal section.

* * * * *

UNITED STATES PATENT AND TRADEMARK OFFICE
CERTIFICATE OF CORRECTION

| | | |
|---|---|---|
| PATENT NO. | : 7,838,805 B2 | Page 1 of 1 |
| APPLICATION NO. | : 12/066652 | |
| DATED | : November 23, 2010 | |
| INVENTOR(S) | : Armellin et al. | |

It is certified that error appears in the above-identified patent and that said Letters Patent is hereby corrected as shown below:

In column 6, line 50, in Claim 17, change "claim 14" to --claim 1--.

Signed and Sealed this
Nineteenth Day of July, 2011

David J. Kappos
*Director of the United States Patent and Trademark Office*